(12) United States Patent
Oh et al.

(10) Patent No.: US 8,160,103 B2
(45) Date of Patent: Apr. 17, 2012

(54) METHOD AND APPARATUS FOR GENERATING PREAMBLE OF DATA PACKET

(75) Inventors: Ji-sung Oh, Seongnam-si (KR); Jun-yeub Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 576 days.

(21) Appl. No.: 12/342,131

(22) Filed: Dec. 23, 2008

(65) Prior Publication Data

US 2009/0175261 A1 Jul. 9, 2009

Related U.S. Application Data

(60) Provisional application No. 61/018,702, filed on Jan. 3, 2008.

(30) Foreign Application Priority Data

Feb. 21, 2008 (KR) .................. 10-2008-0015912

(51) Int. Cl.
*H04J 3/24* (2006.01)
*H04J 3/06* (2006.01)
(52) U.S. Cl. ........................ 370/474; 370/350
(58) Field of Classification Search ........................ None
See application file for complete search history.

(56) References Cited

U.S. PATENT DOCUMENTS 7,215,725 B2 5/2007 Yousef et al.
2007/0113159 A1 5/2007 Lakkis
2007/0115869 A1 5/2007 Lakkis
2007/0168841 A1 7/2007 Lakkis
2007/0248175 A1 10/2007 Bruninghaus et al.
2009/0125792 A1* 5/2009 Lakkis ..................... 714/783
2009/0163143 A1* 6/2009 De Rore ..................... 455/63.1

FOREIGN PATENT DOCUMENTS

KR 1020050066990 A 6/2005

OTHER PUBLICATIONS

Communication dated Jun. 7, 2011 from the European Patent Office in counterpart European application No. 08866022.0.

* cited by examiner

*Primary Examiner* — Kwang B Yao
*Assistant Examiner* — Jutai Kao
(74) *Attorney, Agent, or Firm* — Sughrue Mion, PLLC

(57) ABSTRACT

Provided are a method and apparatus for generating a preamble of a data packet. The method includes operations of generating a first field, a second field, and a third field; generating a synchronization sequence for synchronization between a data packet transmitter and a data packet receiver, generating a channel estimation sequence (CES) for estimation of a property of a channel in which the data packet is transmitted, and generating an additional sequence indicating an end position of the synchronization sequence in the preamble, and an additional sequence indicating information about a structure of the CES; and respectively recording the synchronization sequence, the additional sequences, and the CES in the first field, the second field, and the third field, thereby generating the preamble.

12 Claims, 4 Drawing Sheets

- Let $S_{512} = [g1\ g2\ g3\ g4]$, where $g_i$ is a 128 Golay Sequence.
  1) when $d1 = -g1$, $d2 = -g2$, $d3 = -g3$, $d4 = -g4$, CES length = 4 symbols (Long CES)
  2) when $d1 = -g1$, $d2 = -g2$, $d3 = g3$, $d4 = g4$, CES length = 2 symbols (Short CES)

| ADDITIONAL SEQUENCE FIELD | | | | CES FIELD 1 | | CES FIELD 2 | |
|---|---|---|---|---|---|---|---|
| $-g_1$ | $-g_2$ | $-g_3$ | $-g_4$ | $u_{512}$ | $v_{512}$ | $u_{512}$ | $v_{512}$ |
| $-g_1$ | $-g_2$ | $g_3$ | $g_4$ | $u_{512}$ | $v_{512}$ | None | |
| $-g_1$ | $-g_2$ | $-g_3$ | $g_4$ | $u_{512}$ | $v_{512}$ | $u_{512}$ | $-v_{512}$ |
| $-g_1$ | $-g_2$ | $g_3$ | $-g_4$ | $u_{512}$ | $u_{512}$ | $v_{512}$ | $v_{512}$ |

METHOD AND APPARATUS FOR GENERATING PREAMBLE OF DATA PACKET

This application claims the benefit of U.S. Provisional Patent Application No. 61/018,702, filed on Jan. 3, 2008, in the U.S. Patent and Trademark Office, and the benefit of Korean Patent Application No. 10-2008-0015912, filed on Feb. 21, 2008, in the Korean Intellectual Property Office, the disclosures of which are incorporated herein their entirety by reference.

The present invention relates to a method and apparatus for generating a preamble of a data packet in a wireless personal area network (WPAN) and other types of wireless networks. A wireless personal area network (WPAN) is a wireless network in which devices within a short distance perform data communication at low power. A technique whereby a large capacity of data can be transmitted at a frequency band of 60 GHz in the WPAN, at high speed by using a millimeter wave having a short wavelength of 1-10 mm and strong directivity, has recently been developed.

This technique can enable high definition or high quality multimedia (video/audio) contents to be transmitted without being compressed in the WPAN so as to overcome any problem associated with the transmission of compressed data (e.g., high cost, longer delay, codec support requirement and so forth) due to a certain limited bandwidth in the network.

A preamble represents a sequence used in synchronization of transmission timing between two or more systems in a wireless local area network (LAN) based on a data packet, or in a network communication via a transmission standard based on a personal area network (PAN). In such a preamble, a channel estimation sequence (CES) is used in estimation of a property of a channel in which a data packet is transmitted, and is a main component forming the preamble.

The present invention provides a method and apparatus for generating a preamble of a data packet, whereby a data packet is transmitted together with information about a channel estimation sequence (CES) of the data packet to a receiver.

According to an aspect of the present invention, there is provided a method of generating a preamble of a data packet, the method including the operations of generating a first field, a second field, and a third field; generating a synchronization sequence for synchronization between a data packet transmitter and a data packet receiver, generating a CES for estimation of a property of a channel in which the data packet is transmitted, and generating an additional sequence indicating an end position of the synchronization sequence in the preamble, and an additional sequence indicating information about a structure of the CES; and respectively recording the synchronization sequence, the additional sequences, and the CES in the first field, the second field, and the third field, thereby generating the preamble.

In the preamble, the second field, in which the additional sequences are recorded, may be disposed before the third field in which the CES is recorded.

The additional sequence indicating the end position of the synchronization sequence may be located in a head portion of the second field in which the additional sequences are recorded, and the additional sequence indicating the information about the structure of the CES may be located in the remaining portions of the second field.

The operation of generating the additional sequences may include the operation of using the synchronization sequence, and using a sequence obtained by inversing a sign of the synchronization sequence, thereby generating the additional sequences.

When the additional sequences are recorded in the second field, the operation of generating the preamble may include the operation of arraying and recording the synchronization sequence and the sign-inversed synchronization sequence according to the structure of the CES recorded in the third field.

The information about the structure of the CES may include at least one of the number of symbols of the CES, and a pattern of the CES.

According to another aspect of the present invention, there is provided an apparatus for generating a preamble of a data packet, the apparatus including a field generation unit generating a first field, a second field, and a third field; a sequence generation unit generating a synchronization sequence for synchronization between a data packet transmitter and a data packet receiver, generating a CES for estimation of a property of a channel in which the data packet is transmitted, and generating an additional sequence indicating an end position of the synchronization sequence in the preamble, and an additional sequence indicating information about a structure of the CES; and a preamble generation unit respectively recording the synchronization sequence, the additional sequences, and the CES in the first field, the second field, and the third field, thereby generating the preamble.

According to another aspect of the present invention, there is provided a computer readable recording medium having recorded thereon a program for executing a method of generating a preamble of a data packet, the method including the operations of generating a first field, a second field, and a third field; generating a synchronization sequence for synchronization between a data packet transmitter and a data packet receiver, generating a CES for estimation of a property of a channel in which the data packet is transmitted, and generating an additional sequence indicating an end position of the synchronization sequence in the preamble, and an additional sequence indicating information about a structure of the CES; and respectively recording the synchronization sequence, the additional sequences, and the CES in the first field, the second field, and the third field, thereby generating the preamble.

The above and other features and advantages of the present invention will become more apparent by describing in detail exemplary embodiments thereof with reference to the attached drawings in which.

The present invention will now be described more fully with reference to the accompanying drawings, in which exemplary embodiments of the invention are shown.

Figure 1:
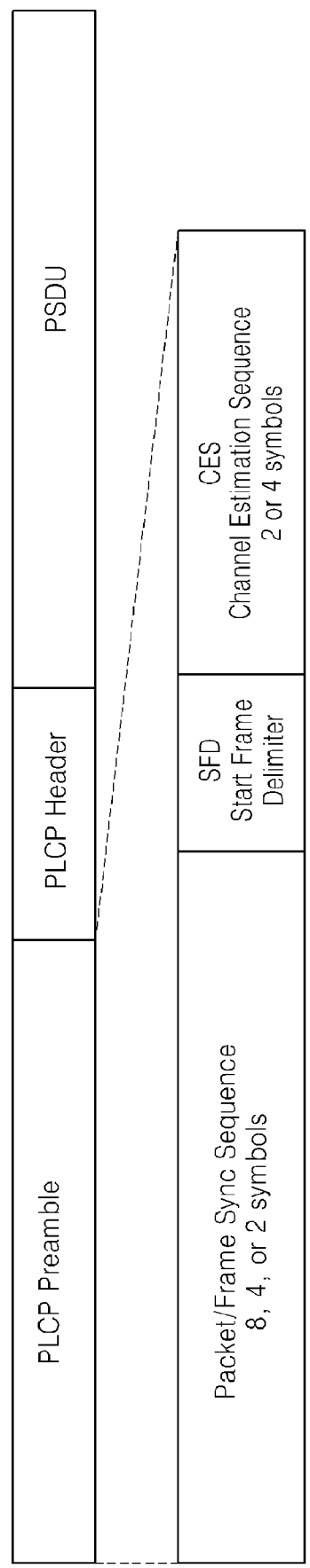
FIG. 1 is a diagram of a structure of a data packet.

FIG. 1 is a diagram of a structure of a data packet. In particular, FIG. 1 illustrates a structure of a data packet in an 802.15.3c standard. Such a data packet can comprise a Physical Layer Convergence Procedure (PLCP) preamble, a PLCP header, and a Physical layer Service Data Unit (PSDU).

The PLCP preamble can be formed of 3 fields individually entitled a Packet/Frame Sync Sequence, a Start Frame Delimiter (SFD), and a CES. Here, the Packet/Frame Sync Sequence is used in synchronization between a data packet receiver and a data packet transmitter and may be formed of 8, 4, or 2 symbols. The SFD indicates an end position of the Packet/Frame Sync Sequence in the PLCP preamble.

Meanwhile, the CES may be formed of 2 or 4 symbols according to an environment of a channel in which a data packet is transmitted. For example, there is a difference between channel environments of portable devices, or between channel environments of a television (TV) and a set-top box. According to such a difference between each of the channel environments, a length of the CES varies.

A data packet receiver compares a difference between a pre-defined CES and a CES received from a data packet transmitter via a channel so as to determine a property of the channel. Thus, in the case where the data packet transmitter changes and transmits a length of a CES, the data packet transmitter should inform the data packet receiver of a changed length of the CES.

Accordingly, the data packet transmitter transmits additional information to the data packet receiver so that the data packet receiver can distinguish the changed length of the CES. Referring to FIG. 1, the PLCP header has a CES mode field that includes a sequence indicating a length of a CES.

Figure 2:
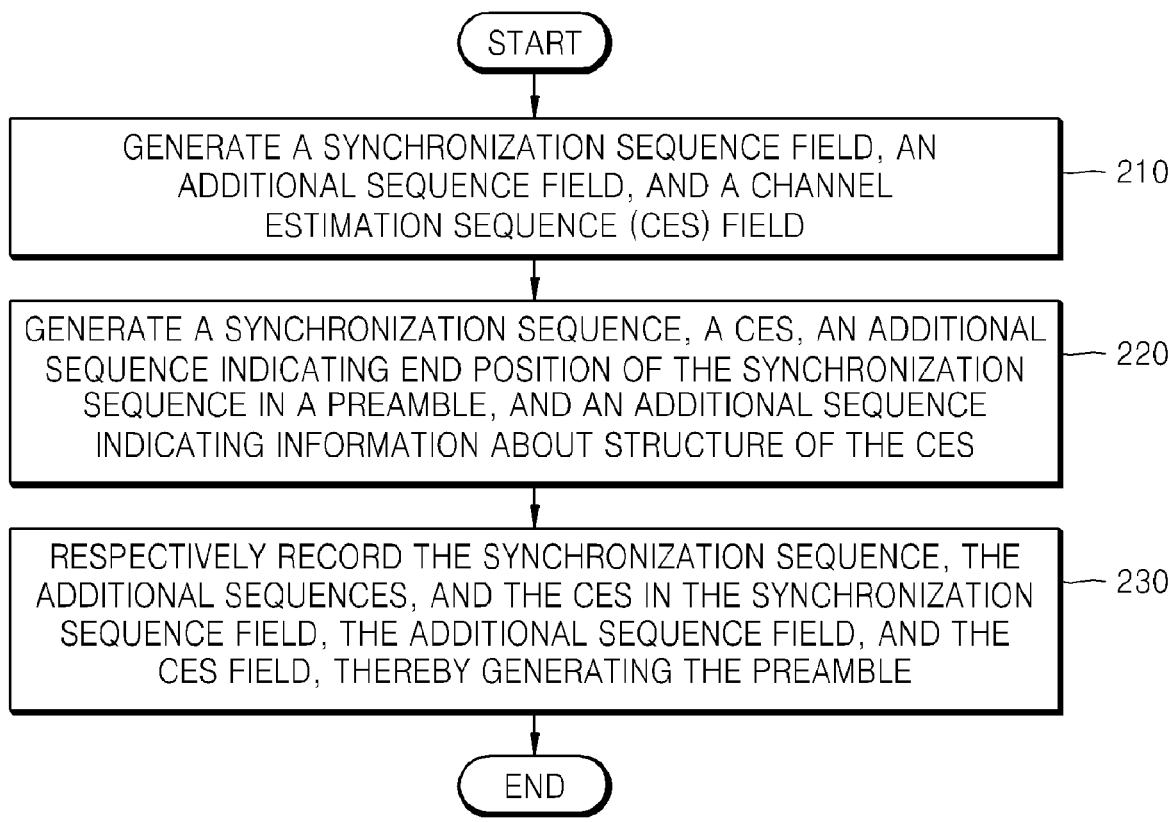
FIG. 2 is a flowchart showing a method of generating a preamble of a data packet, according to an embodiment of the present invention.

FIG. 2 is a flowchart showing a method of generating a preamble of a data packet, according to an exemplary embodiment of the present invention.

In operation 210, a synchronization sequence field, an additional sequence field, and a channel estimation sequence (CES) field are generated. Here, in the synchronization sequence field, a synchronization sequence for synchronization between a data packet transmitter and a data packet receiver can be recorded. In the additional sequence field, additional sequences, which indicate an end position of the synchronization sequence in the preamble and indicate information about a structure of a CES, are recorded. In the CES field, a CES for estimation of a property of a channel in which the data packet is transmitted is recorded.

In operation 220, the synchronization sequence, the additional sequences, and the CES are generated. Here, the additional sequence can again indicate an end portion of the synchronization sequence in the preamble and information about a structure of CES.

In operation 230, the synchronization sequence, the additional sequences, and the CES are respectively recorded in the synchronization sequence field, the additional sequence field, and the CES field to generate the preamble. Configuration and method of generating a preamble of a data packet according to an exemplary embodiment of the present invention can be implemented in a variety of manners without departing from the scope of the present invention.

Figure 3:
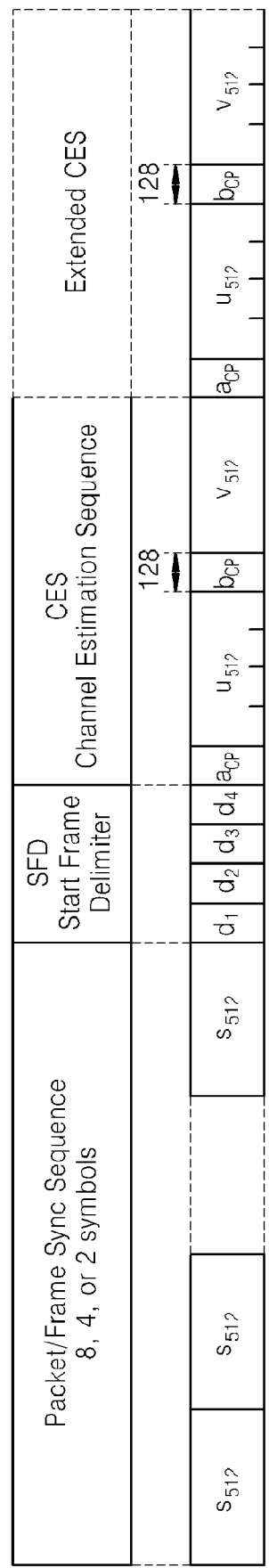
FIG. 3 is a diagram of a preamble generated using a method of generating a preamble of a data packet, according to an embodiment of the present invention.

FIG. 3 is a diagram of a preamble generated using a method of generating a preamble of a data packet, according to an exemplary embodiment of the present invention.

Referring to FIG. 3, the preamble according to the current embodiment of the present invention can be formed of a Packet/Frame Sync Sequence field, a Start Frame Delimiter (SFD) field, and a CES field, similar to the PLCP preamble illustrated in FIG. 1.

In the preamble of FIG. 3, the Packet/Frame Sync Sequence field can include a plurality of symbols $S_{512}$. Each symbol can have 512 bits and be formed of 4 synchronization sequences g1, g2, g3, and g4, each having 128 bits. According to an exemplary embodiment of the present invention, g1 can be a 128 Golay sequence but be not limited to any specific sequence. In according to an exemplary embodiment of the present invention, in the preamble of FIG. 3, the Packet/Frame Sync Sequence field is formed of repeated symbols which may be 2 $S_{512}$, 4 $S_{512}$, and 8 $S_{512}$, but the number of symbols forming the Packet/Frame Sync Sequence field is not limited thereto. For example, the Packet/Frame Sync Sequence field may be formed of one or more symbols.

Meanwhile, in the preamble of FIG. 3, the SFD field may correspond to the additional sequence field of FIG. 2, and include not only a sequence for indication of an end position of a synchronization sequence but also a sequence for indication of information about a structure of a CES, unlike the SFD field illustrated in FIG. 1.

The SFD field in the preamble of FIG. 3 can be divided into d1 through d4 areas. The synchronization sequences g1, g2, g3, and g4, and sign-inversed synchronization sequences −g1, −g2, −g3, and −g4 are associated and recorded in each of the d1 through d4 areas. In this manner, the additional sequence field may be generated by generating a new field but may also be generated by using an existing SFD field.

For example, in the preamble of FIG. 3, if the SFD field is formed of −g1, −g2, −g3, and −g4, the sign-inversed synchronization sequences −g1 and −g2 may indicate that a synchronization sequence is ended, and the sign-inversed synchronization sequences −g3 and −g4 may indicate that a CES is formed of 4 symbols.

Also, if the SFD field is formed of −g1, −g2, g3, and g4, the sign-inversed synchronization sequences −g1 and −g2 may indicate that a synchronization sequence is ended, and the synchronization sequences g3 and g4 may indicate that a CES is formed of 2 symbols. In this manner, an additional sequence indicating an end position of a synchronization sequence may be located in a head portion of the additional sequence field according to the current embodiment of the present invention, and an additional sequence indicating information about a structure of a CES may be located in the remaining portions of the additional sequence field.

In the preamble of FIG. 3, the SFD field corresponding to the additional sequence field is divided into 4 areas which are the d1 through d4 areas. However, according to other embodiments, the additional sequence field may be divided into more than 4 areas.

The CES field of FIG. 3 may be formed of 2 CES symbols $U_{512}$ and $V_{512}$. Also, the CES field may be formed of 4 CES symbols, and in this case, the CES field may be formed of $U_{512}$, $V_{512}$, $U_{512}$, and $V_{512}$, thereby having a repetitive pattern as illustrated in FIG. 3. An Extended CES field of FIG. 3 may be configured to be similar to the CES filed of FIG. 3.

As described above, in the preamble generated using the method according to an exemplary embodiment of the present invention, information about a structure of a CES, that is, a sequence indicating the number of symbols of the CES and a pattern of the CES is disposed before the CES so that a data packet receiver may recognize the structure of the CES in a currently received data packet without receiving another data packet.

Meanwhile, a CES may have a structure different from that of the CES illustrated in FIG. 3.

Figures 4, 5:
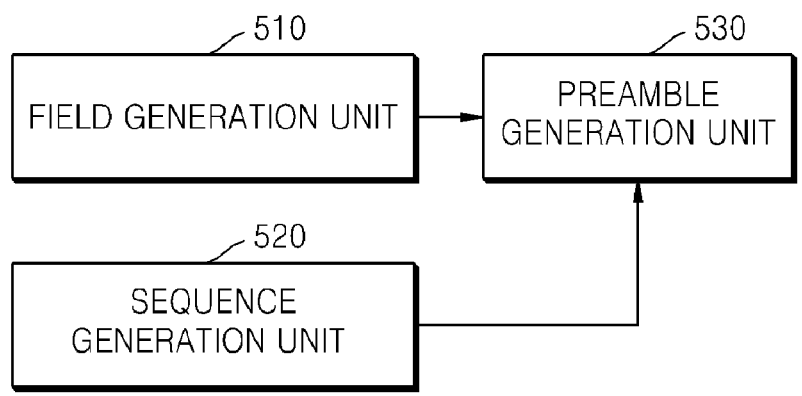
FIG. 4 is a diagram of an additional sequence structure and a channel estimation sequence (CES) structure, according to an embodiment of the present invention.
FIG. 5 is a block diagram of an apparatus for generating a preamble of a data packet, according to an embodiment of the present invention.

FIG. 4 is a diagram of an additional sequence structure and a CES structure, according to an embodiment of the present invention.

In FIG. 4, CES patterns, and additional sequence arrays corresponding to the patterns are illustrated.

In FIG. 4, a total of 4 patterns are illustrated as patterns of a CES field. The first pattern is $U_{512}$, $V_{512}$, $U_{512}$, and $V_{512}$, the second pattern is $U_{512}$ and $V_{512}$, the third pattern is $U_{512}$, $V_{512}$, $U_{512}$, and $-V_{512}$, and the fourth pattern is $U_{512}$, $U_{512}$, $V_{512}$, and $V_{512}$.

Here, an additional sequence corresponding to the first pattern is −g1, −g2, −g3, and −g4, an additional sequence corresponding to the second pattern is −g1, −g2, g3, and g4, an additional sequence corresponding to the third pattern is −g1, −g2, −g3, and g4, and an additional sequence corresponding to the fourth pattern is −g1, −g2, g3, and −g4. In this manner, a preamble according to the previous embodiment of the present invention includes an additional sequence field having information indicating a structure of a CES, so that it is possible to change and transmit a pattern of the CES.

The additional sequence arrays and the CES patterns in the CES fields 1 and 2 in FIG. 4 are not limited to the current embodiment of the present invention. For example, additional sequences in an additional sequence field may be arrayed not in the order of g1, g2, g3, and g4 but in the order of g4, g3, g2, and g1. Also, the CES field may have a pattern of $V_{512}$, $V_{512}$, $U_{512}$, and $U_{512}$.

FIG. 5 is a block diagram of an apparatus for generating a preamble of a data packet according to an exemplary embodiment of the present invention.

Referring to FIG. 5, the apparatus according to the current embodiment of the present invention can include a field generation unit 510, a sequence generation unit 520, and a preamble generation unit 530.

The field generation unit 510 generates a synchronization sequence field, an additional sequence field, and a CES field.

The sequence generation unit 520 generates a synchronization sequence, additional sequences, and a CES.

The preamble generation unit 530 respectively records the synchronization sequence, the additional sequences, and the CES in the synchronization sequence field, the additional sequence field, and the CES field to generate a preamble.

Configuration and method of generating a preamble of a data packet according to an exemplary embodiment of the present invention can be implemented in a variety of manners and comprise other units without departing from the scope of the present invention. For example, an apparatus for generating a preamble of a data packet according to an exemplary embodiment of the present invention can comprise a bus coupling each unit of the apparatus as shown in FIG. 5, at least one processor coupled to the bus to execute instructions of generating the preamble of the data packet as described earlier.

The present invention can be compatible with technologies such as 802.11x and 802.15.3.

According to the present invention, it is possible to transmit a data packet together with information about a CES of the data packet to the data packet receiver.

The embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and storage media. Carrier waves (e.g., transmission through the Internet) containing at least one of the embodiments of the present invention may be temporarily or permanently stored in the computer readable recording medium. Configuration or implementation of computer based instructions according to an embodiment of the present invention can be implemented in a variety of manners without departing from the scope of the present invention.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. WPAN in accordance with an exemplary aspect of the present invention may be applicable to various applications as a wire or cable replacement technology for home entertainment systems capable of transmitting and receiving high definition video and audio, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of generating a preamble of a data packet, the method comprising:

generating a first field, a second field, and a third field;

generating a synchronization sequence for synchronization between a data packet transmitter and a data packet receiver, generating a Channel Estimation Sequence (CES) for estimation of a property of a channel in which the data packet is transmitted, and generating an additional sequence indicating an end position of the synchronization sequence in the preamble and an additional sequence indicating information about a structure of the CES; and respectively recording the synchronization sequence, the additional sequences, and the CES in the first field, the second field, and the third field, thereby generating the preamble, wherein the additional sequence indicating the end position of the synchronization sequence is located in a head portion of the second field in which the additional sequences are recorded, and the additional sequence indicating the information about the structure of the CES is located in the remaining portions of the second field.

2. The method of claim 1, wherein the second field is disposed before the third field in which the CES is recorded.

3. The method of claim 1, wherein the generating of the additional sequences comprises using the synchronization sequence and using a sequence obtained by inversing a sign of the synchronization sequence to generate the additional sequences.

4. The method of claim 3, wherein, when the additional sequences are recorded in the second field, the generating of the preamble comprises arraying and recording the synchronization sequence and the sign-inversed synchronization sequence according to the structure of the CES recorded in the third field.

5. The method of claim 1, wherein the information about the structure of the CES comprises at least one of a plurality of symbols of the CES and a pattern of the CES.

6. A non-transitory computer readable recording medium having recorded thereon a program for executing the method of claim 1.

7. An apparatus for generating a preamble of a data packet, the apparatus comprising:

a field generation unit generating a first field, a second field, and a third field;

a sequence generation unit generating a synchronization sequence for synchronization between a data packet transmitter and a data packet receiver, generating a CES for estimation of a property of a channel in which the data packet is transmitted, and generating an additional sequence indicating an end position of the synchronization sequence in the preamble, and an additional sequence indicating information about a structure of the CES; and a preamble generation unit respectively recording the synchronization sequence, the additional sequences, and the CES in the first field, the second field, and the third field, thereby generating the preamble; and a processor coupled to the field generation unit, the sequence generation unit, and the preamble generation unit, wherein the additional sequence indicating the end position of the synchronization sequence is located in a head portion of the second field in which the additional sequences are recorded, and the additional sequence indicating the information about the structure of the CES is located in the remaining portions of the second field.

8. The apparatus of claim 7, wherein, in the preamble, the second field, in which the additional sequences are recorded, is disposed before the third field in which the CES is recorded.

9. The apparatus of claim 7, wherein the sequence generation unit generates the additional sequences by using the synchronization sequence, and using a sequence obtained by inversing a sign of the synchronization sequence.

10. The apparatus of claim 9, wherein, when the preamble generation unit records the additional sequences in the second field, the preamble generation unit arrays and records the synchronization sequence and the sign-inversed synchronization sequence according to the structure of the CES recorded in the third field.

11. The apparatus of claim 7, wherein the information about the structure of the CES comprises at least one of the number of symbols of the CES, and a pattern of the CES.

12. A device for generating a preamble of a data packet, the device comprising:
 a field generation unit;
 a sequence generation unit;
 a preamble generation unit;
 a bus coupling each unit of the device;
 at least one processor coupled to the bus to execute and perform a method comprising:
  generating a first field, a second field, and a third field;
  generating a synchronization sequence for synchronization between a data packet transmitter and a data packet receiver, generating a Channel Estimation Sequence (CES) for estimation of a property of a channel in which the data packet is transmitted, and generating an additional sequence indicating an end position of the synchronization sequence in the preamble and an additional sequence indicating information about a structure of the CES; and
  respectively recording the synchronization sequence, the additional sequences, and the CES in the first field, the second field, and the third field, thereby generating the preamble,
 wherein the additional sequence indicating the end position of the synchronization sequence is located in a head portion of the second field in which the additional sequences are recorded, and the additional sequence indicating the information about the structure of the CES is located in the remaining portions of the second field.

* * * * *